(12) United States Patent
Losey

(10) Patent No.: US 6,352,093 B1
(45) Date of Patent: Mar. 5, 2002

(54) CONTINUOUS FOLDED BELT AND SPLICE THEREFOR

(75) Inventor: Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/474,034

(22) Filed: Dec. 28, 1999

(51) Int. Cl.⁷ ............... B60C 9/18; B60C 9/20; B60C 9/26
(52) U.S. Cl. ............ 152/528; 152/526; 156/159; 156/304.5
(58) Field of Search ............... 152/526, 528, 152/304.5, 159; 428/58

(56) References Cited

U.S. PATENT DOCUMENTS

| | | | | |
|---|---|---|---|---|
| 2,982,327 A | * | 5/1961 | Vanzo | 152/528 |
| 3,515,621 A | * | 6/1970 | Watson | 428/108 |
| 4,280,547 A | * | 7/1981 | Gilmore | 152/528 |
| 5,535,801 A | * | 7/1996 | Iseki | 152/528 |

FOREIGN PATENT DOCUMENTS

EP 0875402 A1 * 11/1998

* cited by examiner

*Primary Examiner*—Adrienne C. Johnstone
*Assistant Examiner*—Justin R Fischer
(74) *Attorney, Agent, or Firm*—David E Wheeler (57) ABSTRACT

A tire (10) having a continuous folded belt construction (24) is shown to be more durable than conventional tire made using conventional steel reinforced cut belts. The folded belt construction of the invention is made by folding a reinforced (22) strip upon itself, wherein the folding is always in the same direction. The continuous folded belt construction may include an elastomeric core (23) that provides adhesion between the folded layers, and reduces kinking at the folded edges. Also, a splice (28) is used wherein substantial overlap is provided between two ends of the folded belt construction, and is made by cutting a first end (32) of the belt construction to accommodate a second end 44 of the belt construction (24) without modifying the second end 44 of the belt construction, thereby using a minimum amount of labor.

4 Claims, 11 Drawing Sheets

CONTINUOUS FOLDED BELT AND SPLICE THEREFOR

TECHNICAL FIELD

The invention relates to reinforcing components for elastomeric products, and elastomeric products made using the reinforcing component. In an illustrated embodiment, the reinforcing component is a belt package for a pneumatic tire.

BACKGROUND ART

Elastomeric products, such as drive belts, conveyor belts and pneumatic tires are sometimes made with reinforced components, wherein the reinforcement is parallel cords or filaments encapsulated in a rubber matrix. Often, more than one of these components need to be layed up in the product adjacent to another such component, and most often, when more than one layer of reinforcement is used, the cords or filaments in adjacent components have opposing angles. Such components have edges with exposed reinforcement ends, and splices, especially in belts and tires.

When an elastomeric product works, there is a tendency, over time, for the ends of the reinforcement, and the edges of components that have physical properties different from the elastomer, to break free of the elastomer. Also, splices can break loose from the elastomer and cause separations of the reinforcing component from the elastomer. Often, additional components are added to the product, or the product is otherwise modified, to reduce or eliminate these problems.

With respect to radial pneumatic tires, European Patent Application (EPA) 0875402A attempts to solve this problem by providing two belt layers comprising an inclining strip, formed by aligning a plurality of reinforcing cords to a tire circumferential direction, and extending it zig-zag in the tire circumferential direction so that the strip is turned back from the lower belt layer to the upper belt layer at both end portions of the two belt layers. A tire made using this type of reinforcement is said to improve straight driving stability while improving edge separation resistance of the belt layers.

Although the zigzag folding of an elastomeric reinforced strip eliminates the problem of cord ends at a belt edge, such strips still contain a splice. Because two layers of belt are created from a single strip of reinforced elastomer, and the upper belt layer and lower belt layer are disposed at opposed angles, the conventional overlap splice and the conventional butt splice cannot be used with this configuration. The challenges of this kind of construction is to create a splice that can be made with a minimum amount of cutting, i.e., a splice that is not labor intensive, and to create a splice that provides a smooth transition in the composite, i.e., in a completed tire, there are no bulges caused by stacking material in an overlap splice.

It is an object of this invention to provide a reinforcing component which can be used in elastomeric products that does not have cut edges comprising free ends of cord or filament reinforcement, and appears to be substantially spliceless in a completed product.

Other objects of the invention will be apparent from the following description and claims.

DEFINITIONS

"Apex" refers to a wedge of rubber placed between the carcass and the carcass turnup in the bead area of the tire, usually used to stiffen the lower sidewall of the tire.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 28 degrees with respect to the equatorial plane of the tire.

"Carcass ply" means the tire structure apart from the belt structure, tread, undertread, sidewall rubber and the beads.

"Cord" means one of the reinforcement strands of which the plies in the tire are comprised.

"Equatorial plane (EP)" means the plane perpendicular to the tire's axis of rotation and passing through the center of its tread.

"Filament" refers to a single yarn.

"Pantographing" refers to the shifting of the angles of cord reinforcement in a tire when the diameter of the tire changes, e.g. during the expansion of the tire in the mold.

"Ply" means a continuous layer of rubber-coated parallel cords.

"Pneumatic tire" means a mechanical device of generally toroidal shape (usually an open torus) having beads and a tread and made of rubber, chemicals, fabric and steel or other materials. When mounted on the wheel of a motor vehicle, the tire through its tread provides a traction and contains the fluid or gaseous matter, usually air, which sustains the vehicle load.

"Radial" and "radially" means directions radially toward or away from the axis of rotation of the tire.

"Radial-ply tire" means a belted or circumferentially restricted pneumatic tire in which the ply cords which extend from bead to bead are laid at cord angles between 65 to 90 degrees with respect to the equatorial plane of the tire.

"Shoulder" means the upper portion of a sidewall just below the tread edge.

"Sidewall" means that portion of a tire between the tread and the bead.

"Splice" refers to the connection of end of two components, or the two ends of the same component in a tire. "Splice" may refer to the abutment or the overlapping of two such ends.

"Tread" means a molded rubber component which, when bonded to a tire casing, includes that portion of the tire which comes into contact with the road when the tire is normally inflated and under normal load.

SUMMARY OF THE INVENTION

The invention relates to a pneumatic tire having at least a pair of substantially parallel annular beads (12), at least one carcass ply (14) wrapped around the beads, a tread (18) disposed over the at least one carcass ply in a crown area of the tire, and sidewalls (20) disposed between the tread (18) and the beads (12). A reinforcement package (24) is disposed between the tread (18) and the at least one carcass ply (14) in the crown area of the tire, the reinforcement package (24) comprising an elastomeric composite having a second end 44 and a first end (32). The elastomeric composite is reinforced with substantially parallel reinforcement cords (26) oriented at substantially 0° with respect to a longitudinal centerline (CL) of the composite, and the composite is folded upon itself to provide reinforcement package (24)

having an upper layer (46), characterized in that reinforcement cords therein have an angle of 17 to 35° with respect to the equatorial plane (EP) tire (10), and a lower layer (48), wherein reinforcement cords therein have an angle of −17 to −35° with respect to the equatorial plane (EP) of tire (10). The reinforcement package (24) has a splice (28) wherein upper layer (46) at second end tip (37) overlaps with lower layer (48) at a first end (32). The splice (28) comprises a triangular configuration made by cutting upper layer (46) at first end (32) at angle of 17 to 35° with respect to the width of the composite strip for a distance corresponding to 70 to 90% of the width of elastomeric composite (24), and removing all cut reinforcement cords (26) from cut-out (30) at first end (32).

Second end 44 of reinforcement package (24) fits with and overlaps with cut end (32) of reinforcement package (24) without modification.

The reinforcement cords (26) may comprise steel, polyester, polyamide, aromatic polyamide, reconstituted cellulose, polyvinyl alcohol, fiberglass, carbon-fibers and mixtures thereof.

In the illustrated embodiment, the reinforcement cords (26) are selected from the group comprising polyethylene naphthalate, terephthalate, rayon and aramid. The reinforcement cords (26) have a dTex of 3300 to 13000 and an end count in the reinforcement package (24) of 4 to 11 ends per centimeter (e.p.c.).

DETAILED DESCRIPTION OF THE INVENTION

Figure 1:
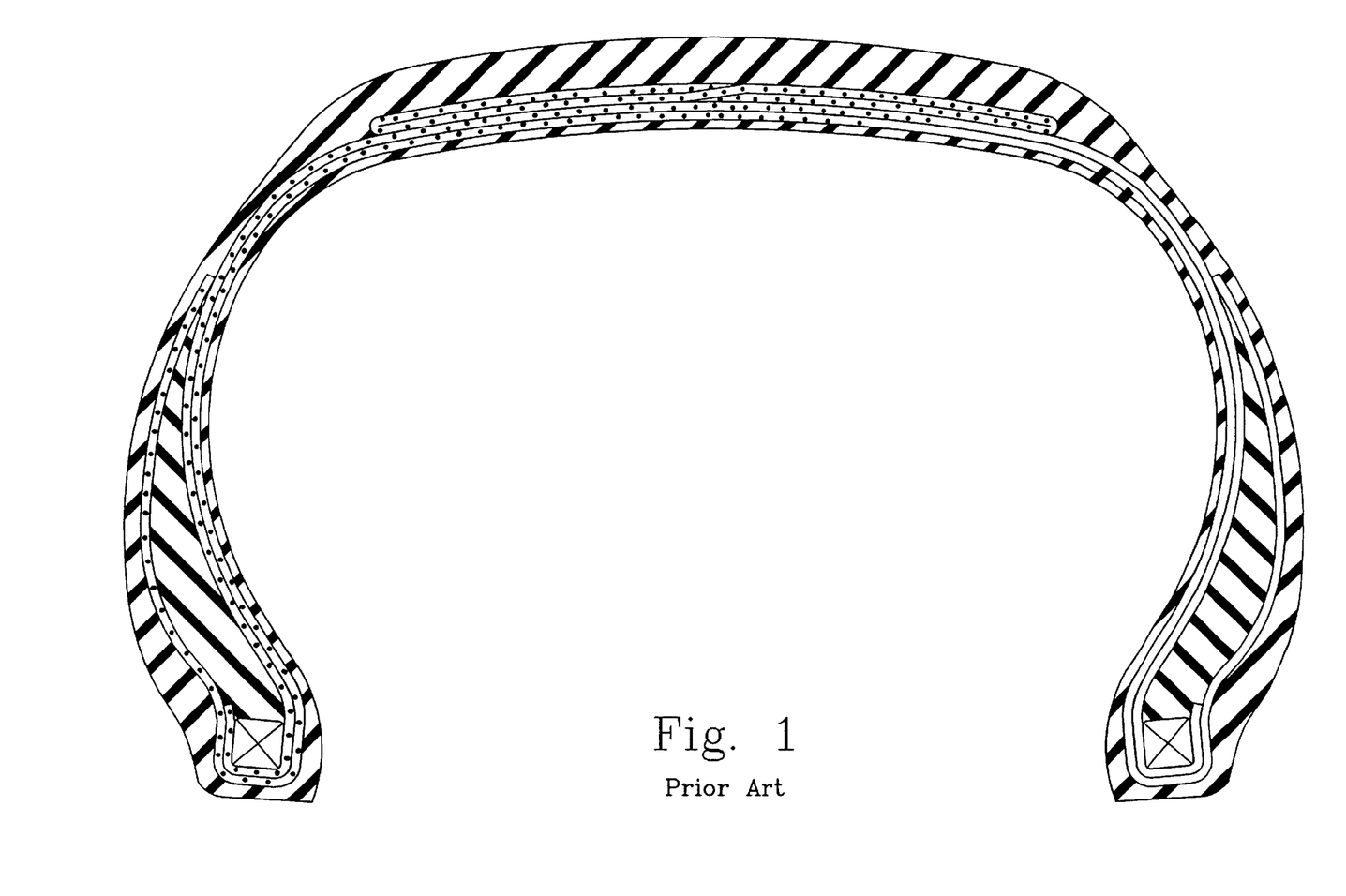
FIG. 1 illustrates a prior art tire using a continuous folded belt.
Figure 2:
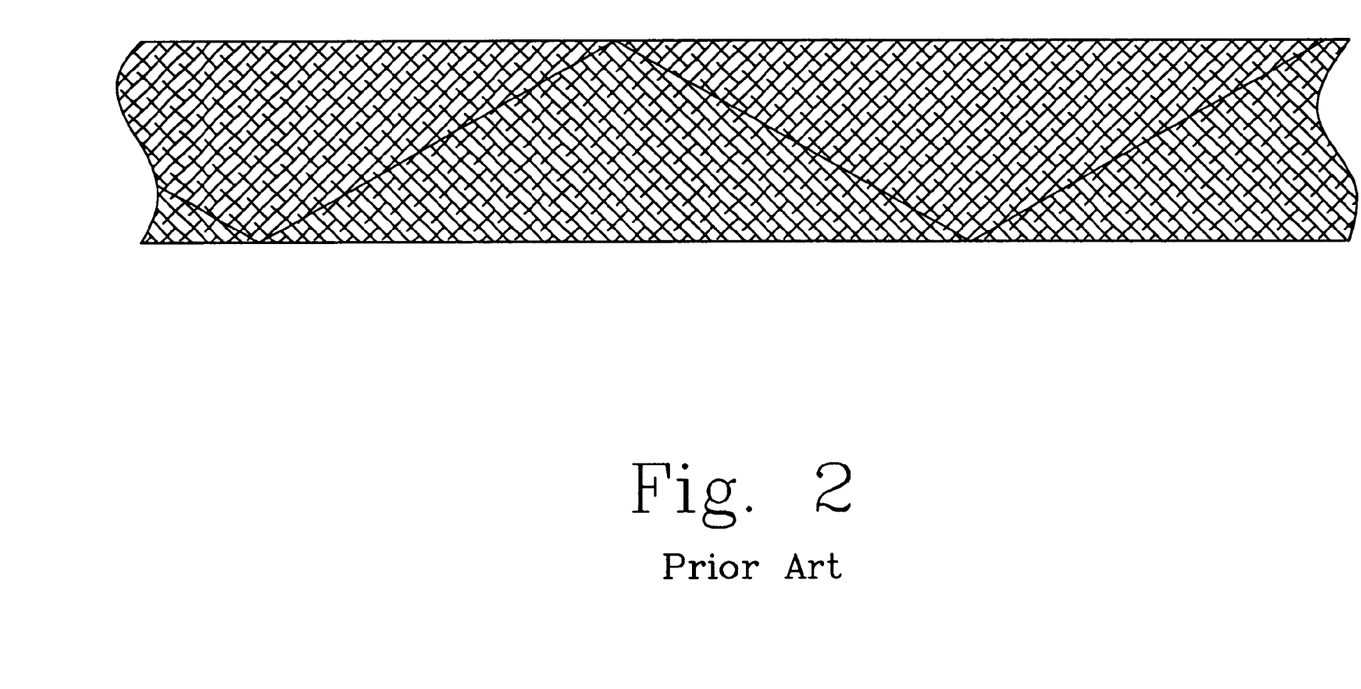
FIG. 2 illustrates a prior art belt reinforcement used in the tire of FIG. 1.
Figure 3:
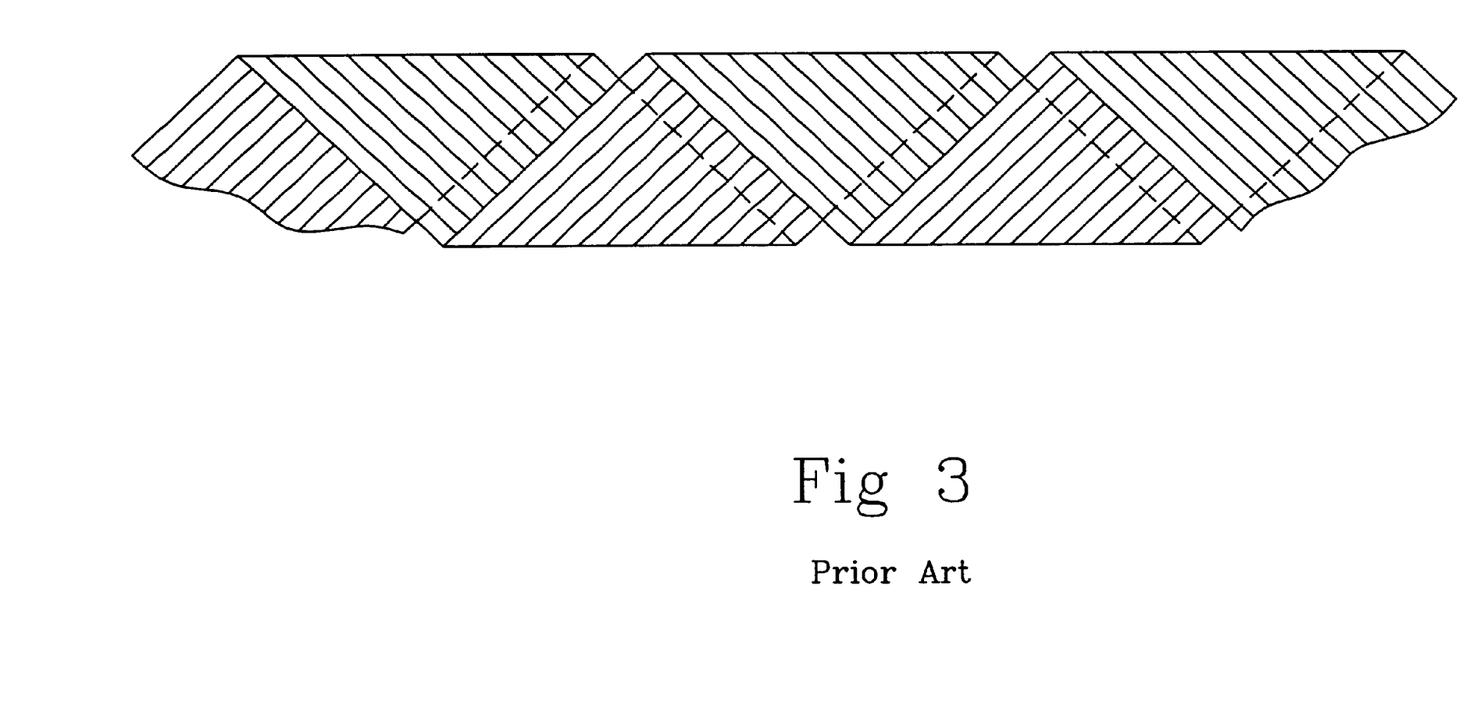
FIG. 3 illustrates an expanded view of the prior art belt reinforcement.

With reference now to FIGS. 1 and 2, prior art belt reinforcement 22, as illustrated in EPO 875402A1, is made by turning a reinforced elastomeric strip back and forth upon itself throughout the circumference of a tire. The reinforcing cords in the strip cross one another between the layers comprising zone portions in which the reinforcing cords incline to the right in the tire circumferential direction, and zone portions in which the reinforcing cords incline to the left in the tire circumferential direction. FIG. 3 illustrates the turning of the elastomeric strip in an extended view so that the lay up of the elastomeric strip can be understood.

Figure 4:
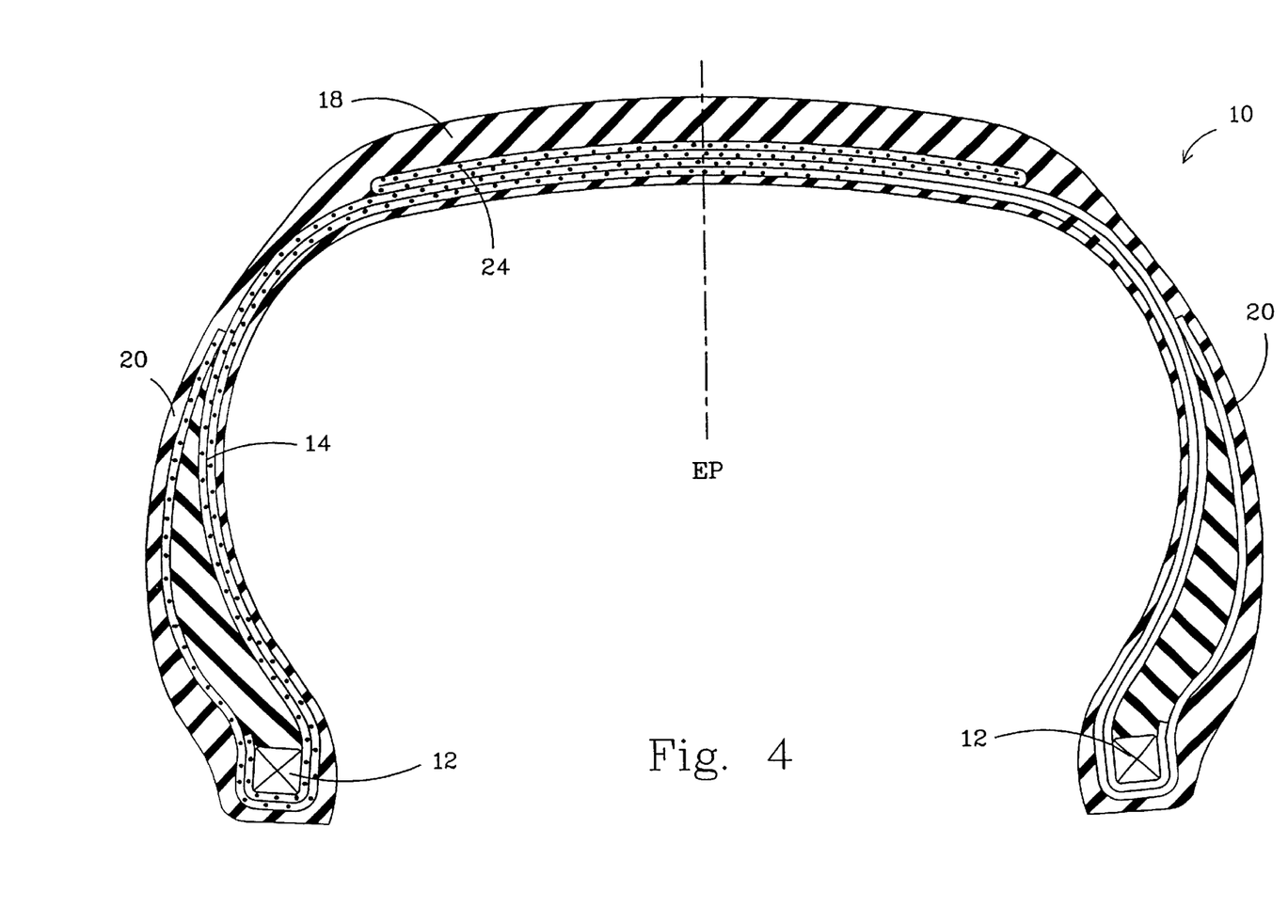
FIG. 4 illustrates a tire of the invention.

With reference now to FIG. 4, a tire of the invention 10 comprises at least a pair of substantially parallel annular beads 12 around which is wrapped at least one carcass ply 14. Belt reinforcement 24 is disposed in a crown area of the tire, and tread 18 is disposed radially outward of belt reinforcement 24. Sidewalls 20 are disposed between tread 18 and beads 12. It is noted that a prior art tire, having the prior art belt reinforcement shown in FIG. 2, could also be fairly represented by FIG. 4 at specific points in the tire, because of the substantial similarity of the cross sections at specific points on the tires, i.e., in the middle of the folded over portions of the reinforced elastomeric strip.

Figure 5:
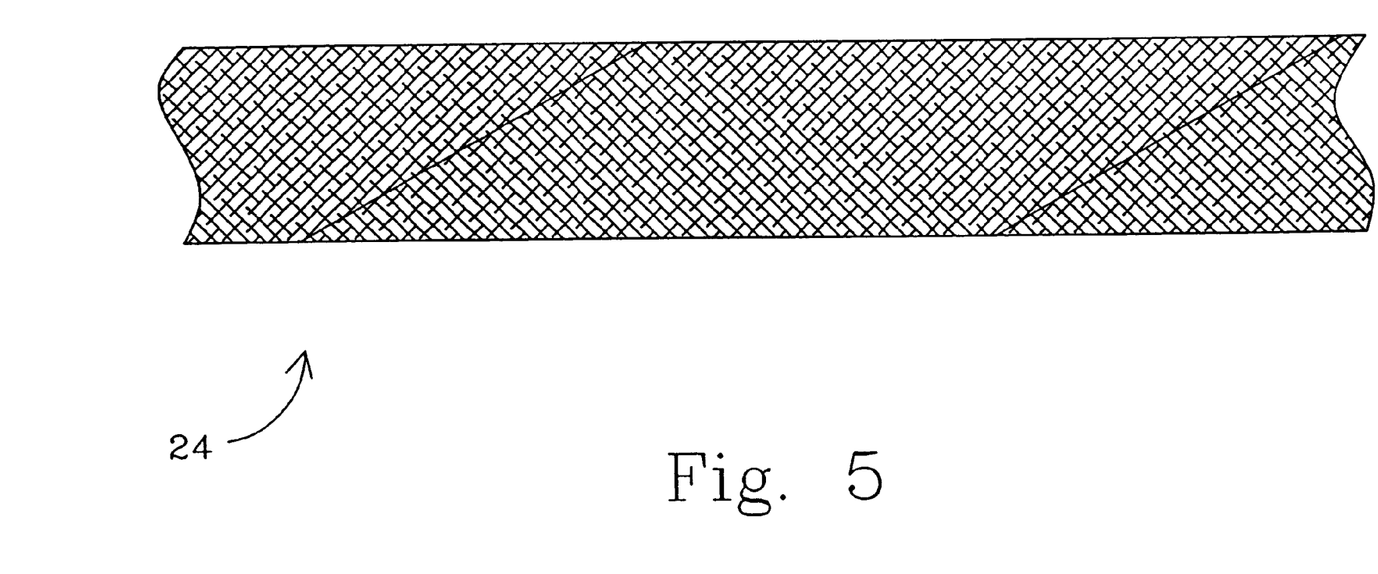
FIG. 5 illustrates a continuous belt of the invention.
Figure 6:
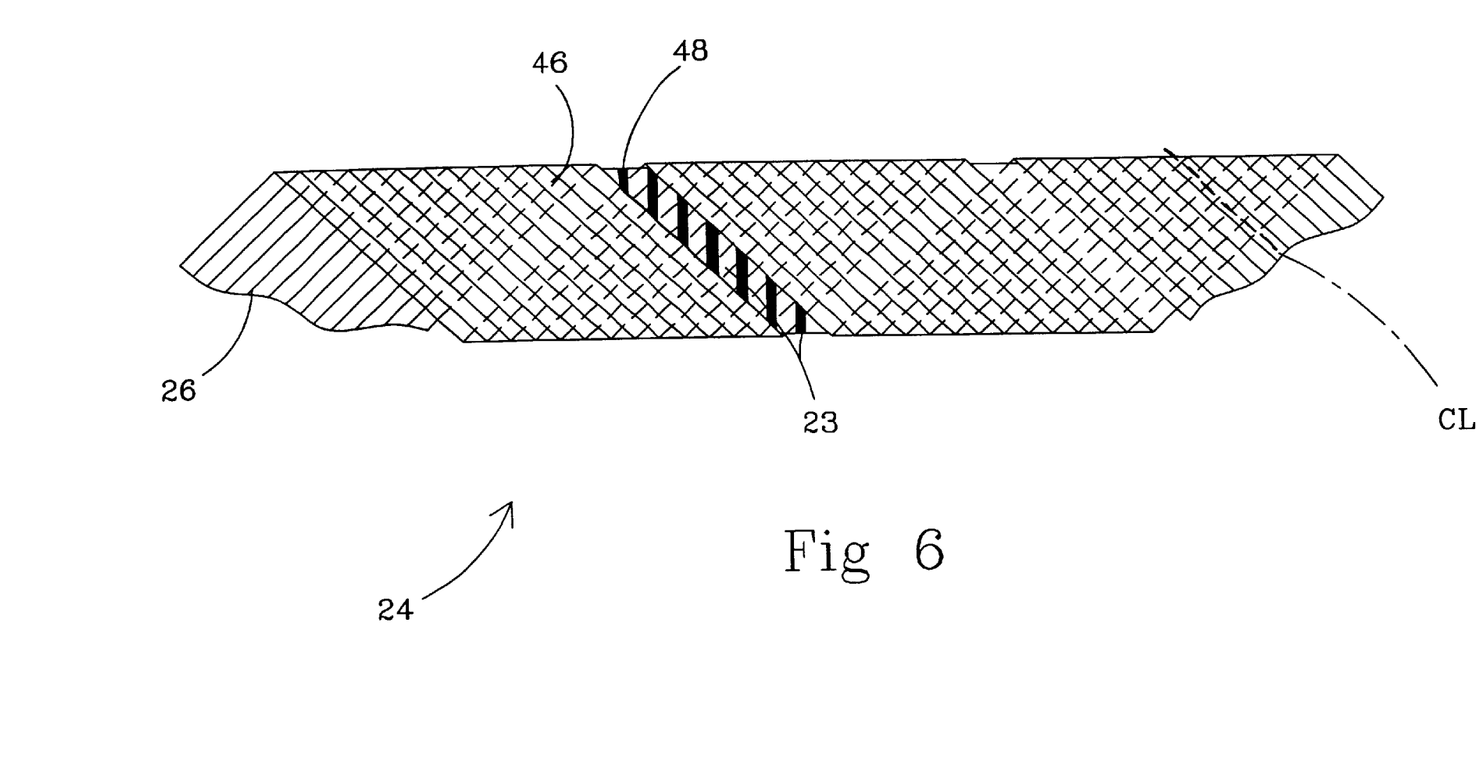
FIG. 6 illustrates an expanded view of a continuous belt of the invention.

With reference now to FIGS. 4, 5 and 6, the belt reinforcement of the invention is illustrated using the same views as used in FIGS. 1, 2 and 3 for the prior art belt reinforcement. In FIGS. 5 and 6, it is shown that instead of folding the reinforced elastomeric strip back and forth upon itself, the belts of the invention are made by continuously folding the strip in the same direction, as if wrapping the elastomeric strip around a core. The core may be imaginary or the core 23 may comprise an elastomer. When no core is used, the rubber from the rivet acts to crosslink the upper portion of the belt with the lower portion of the belt. In one illustrated embodiment, a green rubber core 23, having a width comprising 60% to 95% of the belt width, is used, around which the elastomeric strip is wrapped. In FIG. 6, a portion of a core 23 is illustrated. Those skilled in the art will recognize that when a core 23 is used, core 23 will have the same length as reinforcement 24, and instead of a single core, the core may take the form of belt edge strips.

In an alternative embodiment, the core may comprise a reinforced strip, especially a reinforced strip that has discontinuous reinforcement, such as described by Davisson, in U.S. Pat. No. 4,791,973, incorporated herein by reference.

It is believed that the bending of the reinforcement cords in the same direction reduces the stresses on the cords, and improves the stability of the belt construction. Reduced stress on the reinforcement cords is believed to improve fatigue strength of the cords, and to improve the overall wear properties of the tire. Further reduction of stresses on the folded cords may be obtained by inclusion of the rubber core 23 between the folded layers, which may reduce the kink at the folded edges of the elastomeric strip.

Figure 7:
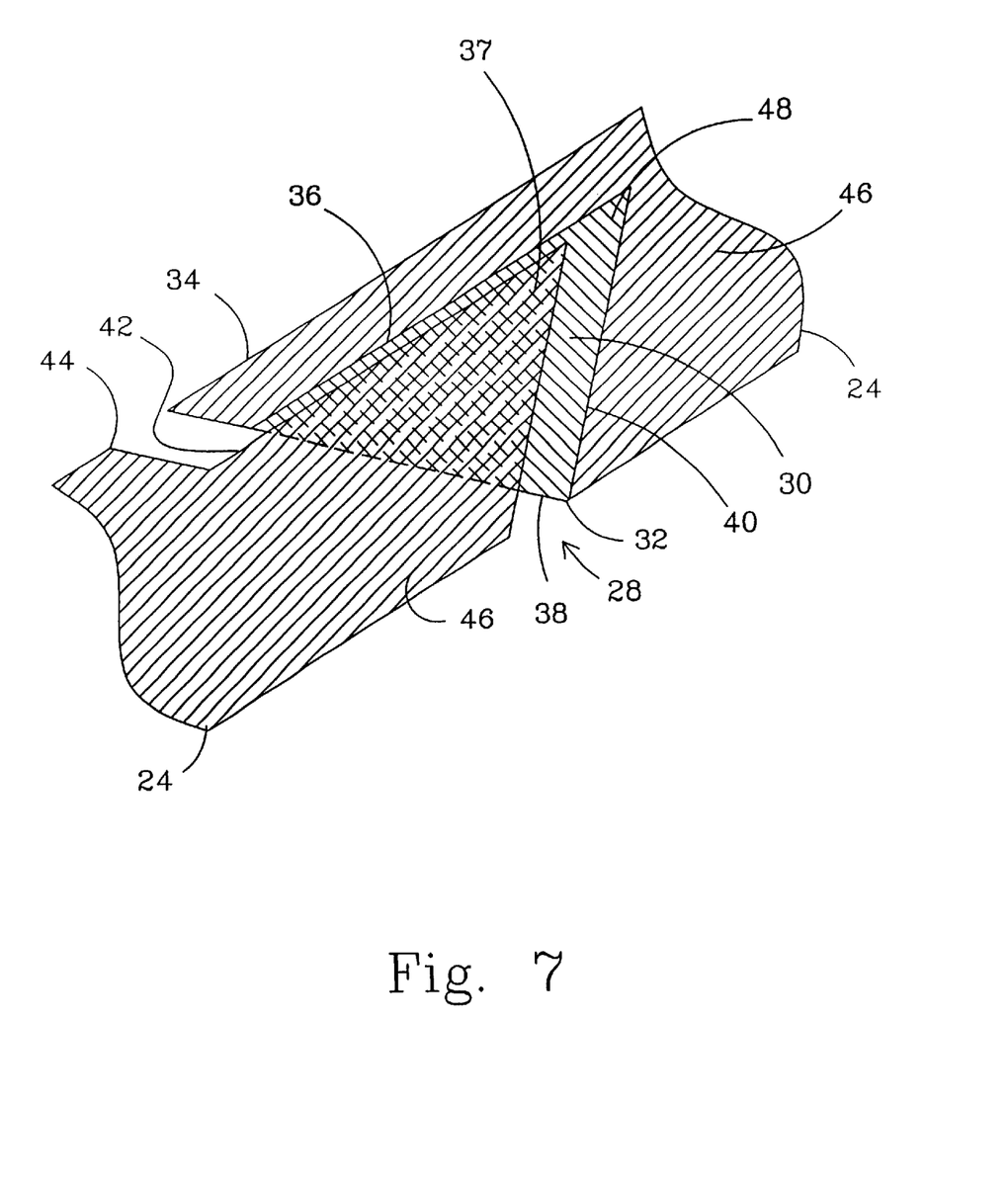
FIG. 7 illustrates a splice for the belt reinforcement of the invention.

With reference now to FIG. 7, the splice portion 28 of belt reinforcement 24 is illustrated. To make splice 28, a cut-out 30 is made in first end 32 of belt 24, wherein a first cut 36 is made parallel to edge 34 of the belt, edge 34 being the longest side of the folded over angle which comprises first end 32 of the belt. In the illustrated embodiment, first cut 36 and a second cut 40 intersect, and with edge 38 form a triangle. The splice 28 comprises a triangular configuration made by cutting upper layer 46 at first end 32 at an angle of 17 to 35° with respect to the width of the composite strip for a distance corresponding to 70 to 90% of the width of elastomeric composite 24. The cut-out portion 30 of first end 32 of belt 24 is shaped so as to fit folded end 42 of the second end 44 of the reinforced strip used to make belt 24, i.e., the folded over end 42 is used without cutting, which reduces the labor involved in making belt splice 28.

Making splice 28 in this manner provides a substantial overlap between first end 32 and second end 44 of the belt, and since folded over end 42 fits within cutout portion 30, there is no extra material thickness in a tire made using belt 24. As illustrated in FIGS. 6 and 7, the cord angles of the upper layer 46 and lower layer 48 are the same in the splice as in the remainder of the belt. Accordingly, strength is maintained in the splice, aided further by a substantial amount of adhesion in the substantial overlap between upper portion 46 and lower portion 48 in the area of splice 28.

Belt reinforcement 24 is preferably made using reinforcement comprising organic filaments or cords, although those skilled in the art will recognize that in particular constructions, a fiber reinforced elastomeric strip can be used to form folded belt structure 24. Organic filaments or cords that may be used as reinforcement may comprise polyesters, aramid, nylon, polyvinyl alcohols, polyalkylenes, cellulose, fiberglass and carbon fibers. Those skilled in the art will recognize that steel cords which have a high degree of flexibility may be used. In the illustrated embodiment, very good results were obtained using polyethylene naphthalate (PEN) cords, which were obtained from Allied Signal.

The PEN cords used in the illustrated tire constructions were processed using a slow draw procedure to produce longer crystals of the PEN material in the filaments. This process is believed to provide better dimensional stability, a better tensile modulus, and other improved physical properties. The cords produced by the process had a nominal linear density of 1100/2/3 dTex (1000/213 denier), and a 4×4 twist, and had a tensile strength of 9.2 dN/tex (10.4 grams per denier (gpd)) and a tensile modulus of 230 dN/tex (260 gpd).

The cords may be dipped using a single end dipping unit, and the cords may be woven into fabric, Alternatively, the fabric may be prepared according to PCT application PCT/97/06757 or PCT97/17272. These applications are incorporated herein by reference. It is believed that the dipping procedure further enhances the properties of the PEN cord. Those skilled in the art will recognize that conventional fabric dipping can be used if safeguards are used to insure proper adhesion, dimensional stability, and maximum uniformity.

It is believed that the specific properties of the PEN cords are secondary, however, since the design or architecture of the belt package is most important to the properties of the tire, and other cord materials and combinations can be used to obtain required belt package properties for a specified tire.

In a method of the invention, an elastomeric strip is first prepared by calendering a plurality of parallel reinforcement cords to produce a calendered strip of material with continuous reinforcement cords parallel to the edge of the calendered strip. Those skilled in the art will recognize that such a calendered strip is made in the preparation of conventional belts, but in order to prepare the conventional belts, the calendered strip is cut on an angle, and the angled ends are spliced together to provide a belt strip having reinforcement at an angle to the edge of the belt strip.

In the present invention, the cutting and splicing of the strip is avoided, since the calendered strip is used in the invention as it comes off the calender, i.e., the reinforcement in the strip is parallel to the edge of the strip.

The calendered strip is cut to a length needed for forming a belt in a tire. For example, in a tire having a green circumference of 226 cm (89 inches), and the green belt had a width of 192 mm, and the cord angle of the reinforcement was 32°.

The calendered strip is folded at an angle of 20 to 40 degrees in a plurality of continuous folds, wherein all the folds are in the same direction, to produce a structure equivalent to wrapping the strip around a pipe or a flat stick, and removing the pipe or stick and flattening the wrapped structure.

A tire has been designed having belt reinforcement comprising 6700 dTex reinforcement cords, made from a strip of calendered material 192 mm wide with a cord density of 11 e.p.c. The folded structure may be made by choosing the desired angle of reinforcement, and making a first fold at the desired angle. In the illustrated embodiment, the angle of reinforcement was chosen to be 30°. Folding may be continued following the same pattern throughout the length of the calendered strip. The splice may be made by cutting the first end of the strip at a 30° angle for a distance corresponding to 85 % of the belt width (163 mm). A second cut made parallel to the edge of the belt will intersect with the first cut, and the severed reinforcement cords can be removed.

In an embodiment wherein the reinforcement is used in the construction of a tire, the first end of the folded, calendered strip is overlapped with the second end of the folded, calendered strip in the crown area of the tire. The first end and second end overlap smoothly, and without stacking reinforcement material in the overlapped portion.

Optionally, adhesive may be placed on one or both ends of the calendered strip and the two ends pressed together.

In an additional embodiment of the method, the calendered strip may be folded over a gum rubber core having a width comprising 60 to 95 % of the width of a belt construction being made, and bending the reinforcement cords or filaments at the folded edges of the calendered strip over the rubber core, the rubber core providing adhesion between the upper and lower folded portions of the calendered strip, as well as providing a spacer that may prevent kinking at the folded edges of the belt. The core may comprise belt edge strips, 1.3 to 3.2 cm (0.5 to 1.25 inches) wide, placed at the folded edges of the belt.

The tire of the invention is otherwise constructed as is known to those skilled in the art.

The invention is further illustrated with reference to the following examples.

EXAMPLE 1

Figure 8:
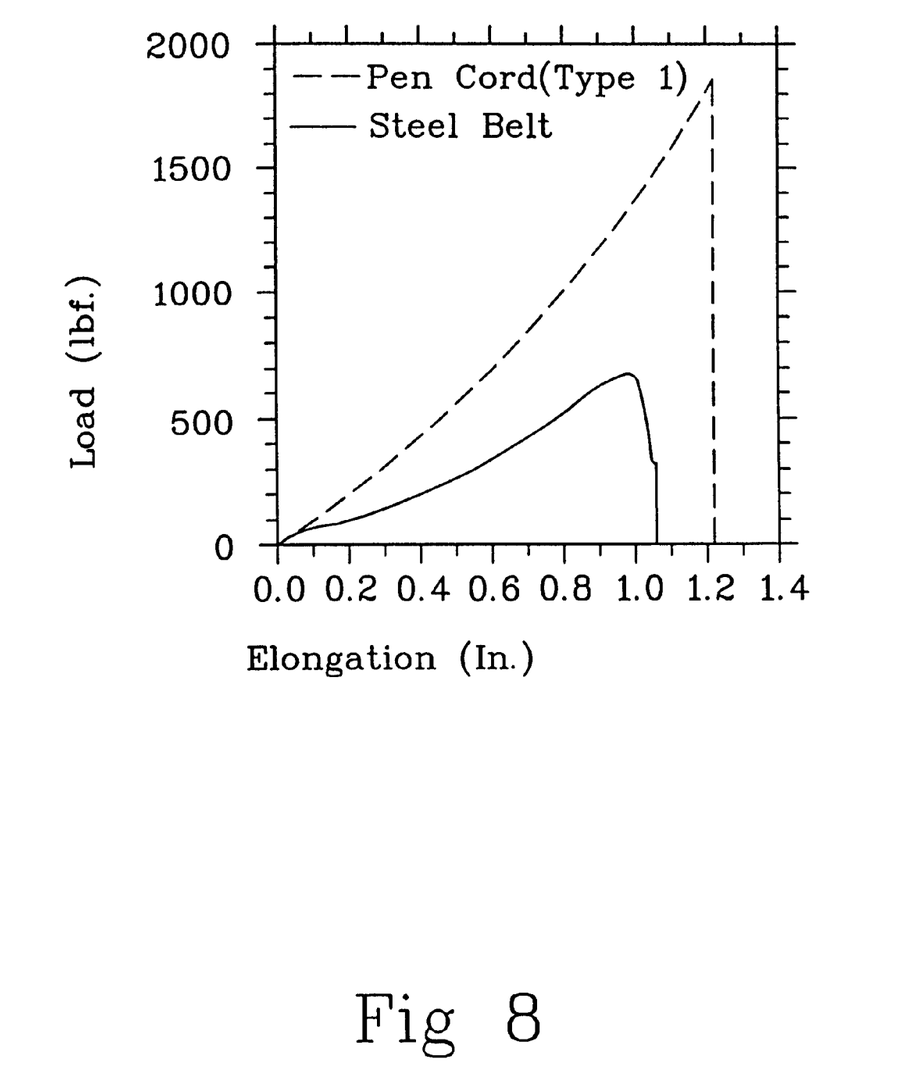
FIG. 8 illustrates a diagram comparing the strengths of a belt of the invention made using PEN reinforcement as compared to the strength of a conventional steel belt.

In this example, the elongation of a conventional steel belt is compared with the elongation of a continuous belt made according to the invention which is made with 6,700 dTex (6,000 denier) PEN reinforcement cord having 8.3 e.p.c. (ends per centimeter) (21 epi (ends per inch)). The belts were constructed in the same manner as such belts would be prepared for use in building a tire, but were subjected to load in a laboratory to determine their strength and elongation properties. As can be seen in FIG. 8, the conventional steel belt showed an elongation of about 2.7 cm (1 inch) with a load of about 2640 N (600 pounds), at which point the belt broke. By contrast, the continuous belt of the invention made with PEN cords showed an elongation of about 3 cm (1.2 inches) at about 8,360 N (1900 pounds) load, whereupon the belt broke.

From FIG. 8, it can be seen that the elongation of the PEN belt at 2,640 N (600 pounds) was about 1.3 cm (½ inch).

This data illustrates that a belt of the invention reinforced with PEN cord can withstand a heavier load, and undergoes less elongation at the same load as compared to a conventional steel belt.

EXAMPLE 2

Figure 9:
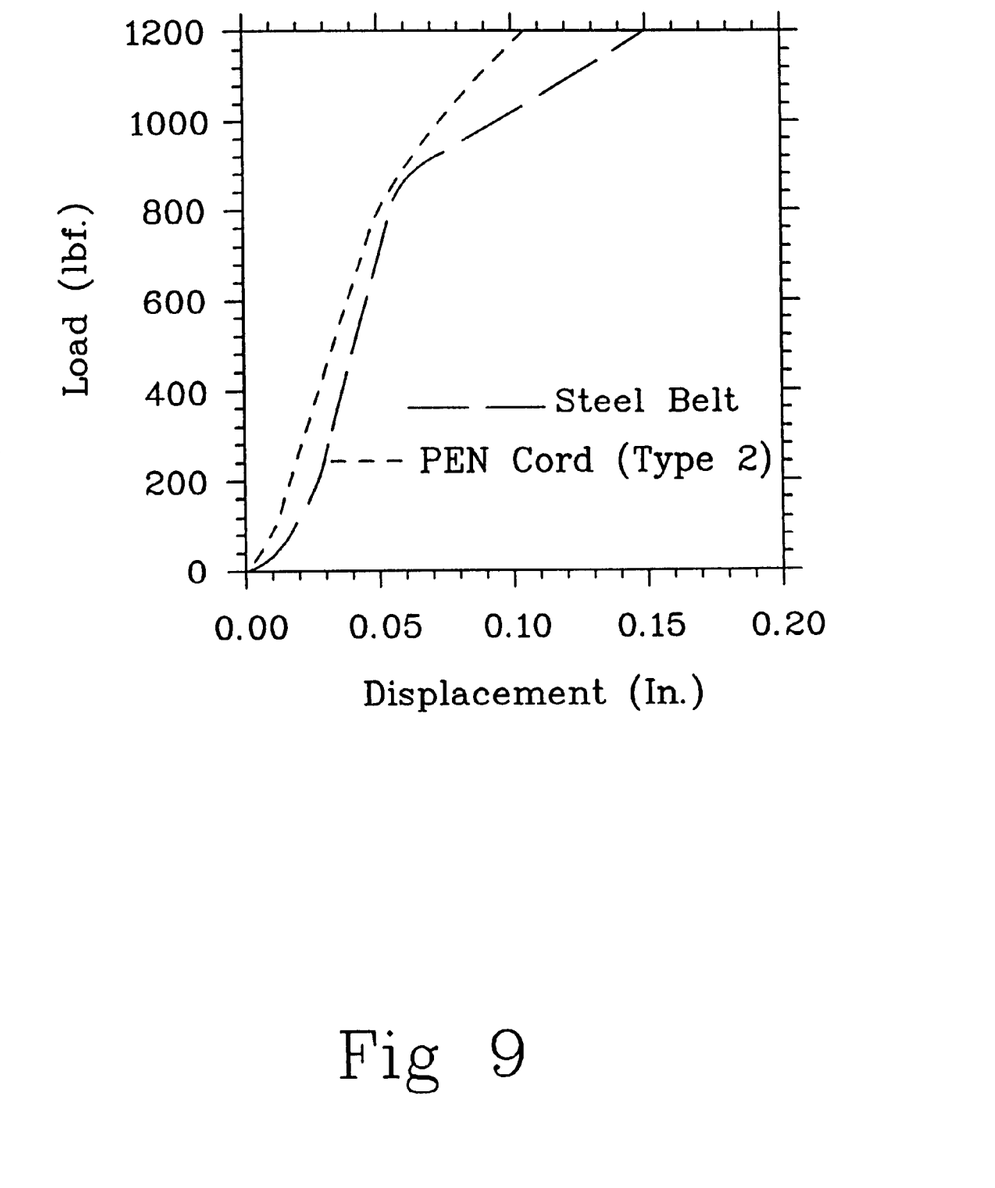
FIG. 9 illustrates load displacement of a reinforcement package of the invention as compared to a conventional steel belt.

In this example, a second belt of the invention, made with PEN cord having a linear density of 6,700 dTex (6,000 denier) and an end count of 11 epc (28 epi) is compared with the steel belt construction referred to in example 1. In this example, with reference to FIG. 9, the displacements of the belts in laboratory testing is shown. As can be seen in the figure, the steel belt held its shape fairly well until the load on the belt exceeded 3,740 N (850 pounds), whereupon the displacement increased rapidly from about 0.13 cm (0.05 inch) to 0.38 cm (0.15 inch) at 5,280 N (1200 pounds). By contrast, the continuous belt of the invention, reinforced with PEN cord, fairly well maintained its shape until the load exceeded 3,520 N (800 pounds), whereupon it deflected from about 0.13 cm (0.05 inch) to about 0.25 cm (0.10 inch) at 5,280 N (1200 pounds).

This data illustrates that the belt of the invention, made using PEN reinforcement cords, theoretically, would make a tire construction which is more able to hold its shape than a tire construction made using conventional cut steel belts.

EXAMPLE 3

Figure 10:
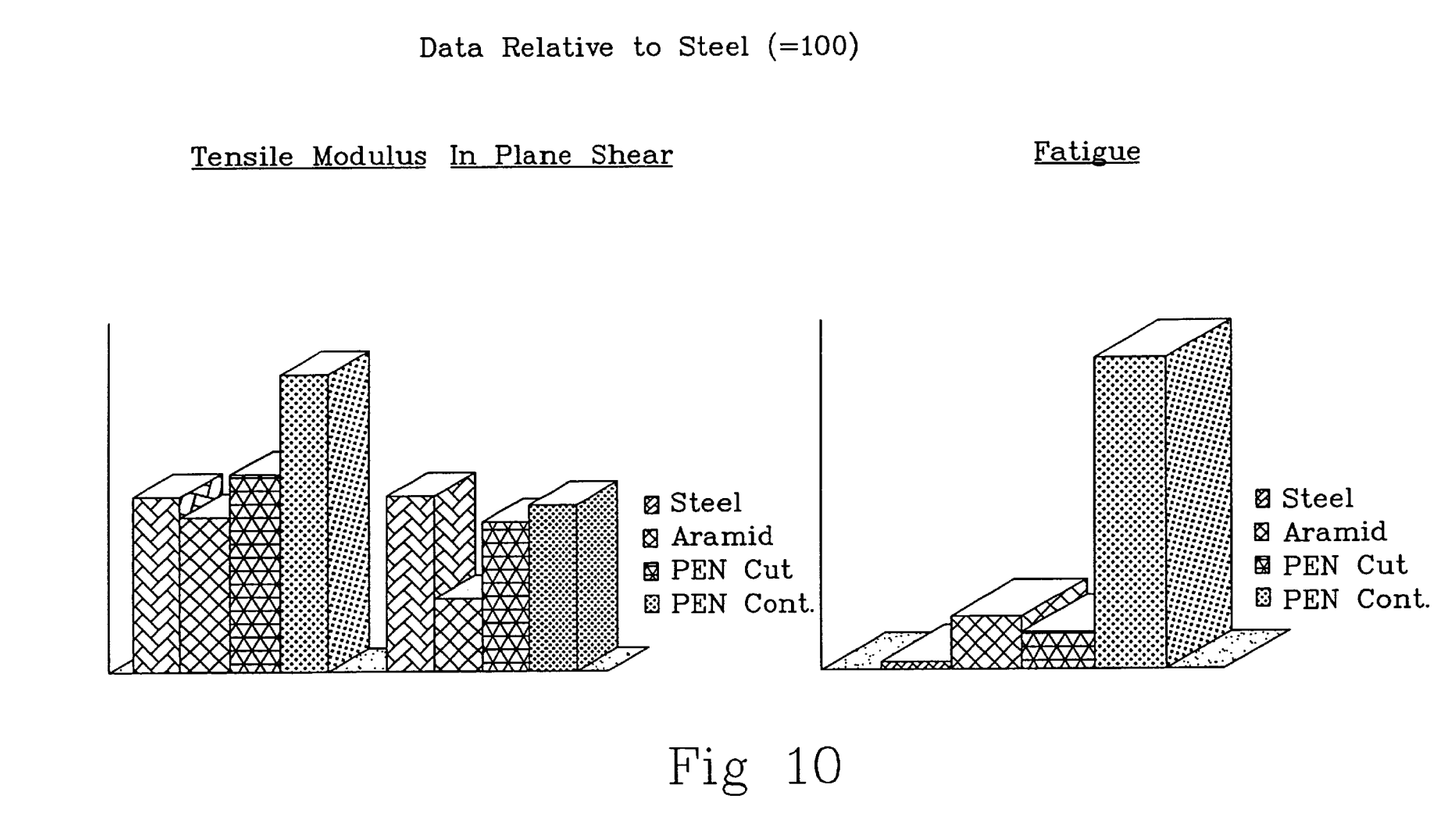
FIG. 10 illustrates the fatigue strengths of belts made using a variety of constructions and a variety of materials.

In this example, relative data for a number of composite belts made of different materials is illustrated. Conventional cut belts made of steel, aramid and PEN are compared with a continuous belt of the invention which is reinforced with PEN cords. The data illustrates, with reference to FIG. 10, that the continuous belt of the invention, made using PEN cord reinforcement, has superior tensile modulus, plane shear, and fatigue properties as compared to the other composites.

EXAMPLE 4

Figure 11:
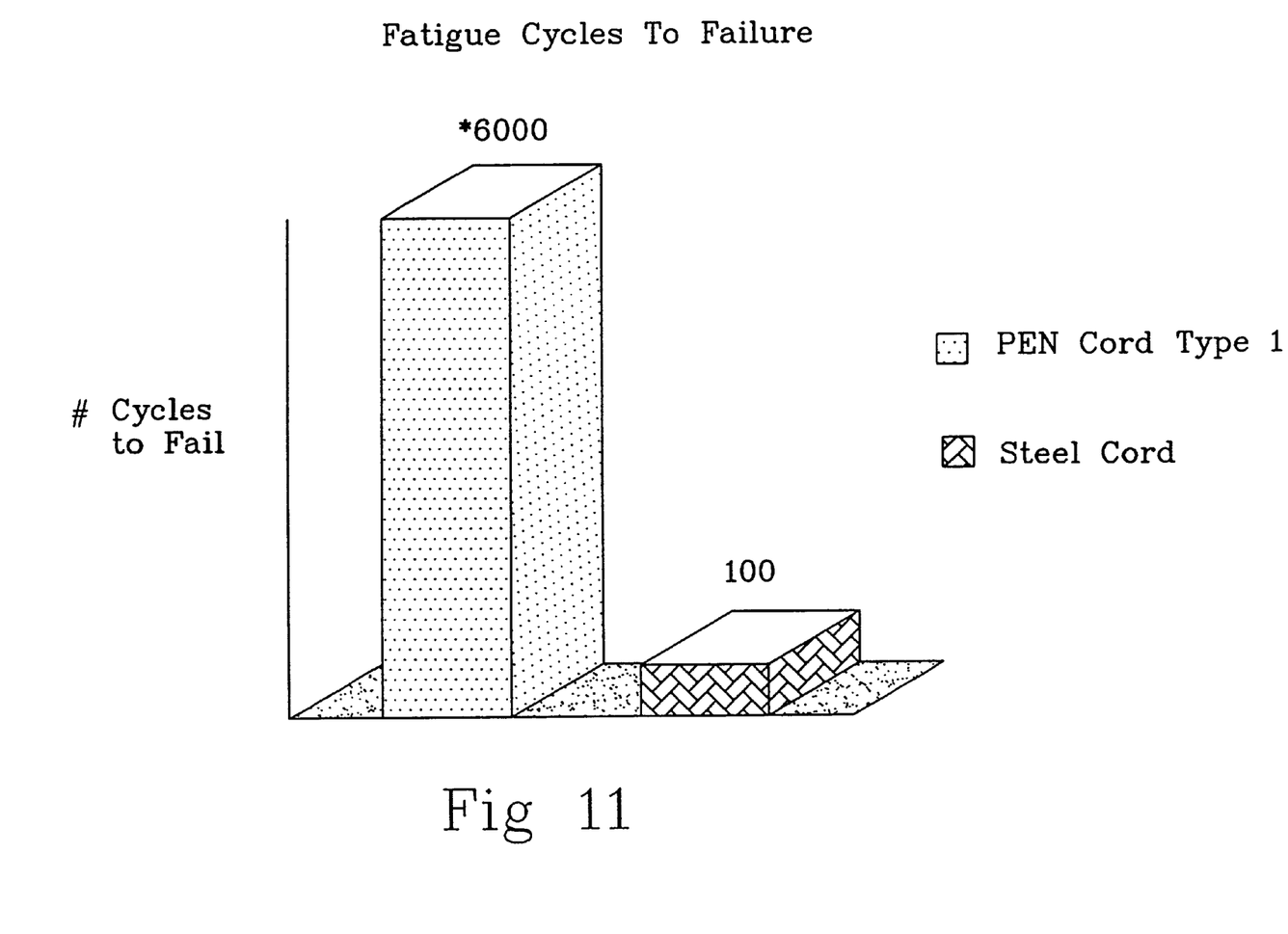
FIG. 11 illustrates the fatigue properties of a belt using PEN reinforcement as compared to a belt made with steel cord reinforcement.

In this example, lab data is provided wherein composite belts made according to the invention are compared with conventional steel cut belts in a fatigue, cycles to failure test. With reference to FIG. 11, the data illustrates that the continuous belt of the invention, reinforced with PEN cords, survived 6,000 cycles to failure, whereas the conventional composite steel cord reinforced cut belts survived 100 cycles to failure.

While the invention has been specifically illustrated and described, those skilled in the are will recognize that the invention may be variously modified and practiced without departing from the spirit of the invention. The scope of the invention is limited only by the following claims.

What is claimed is:

1. A pneumatic tire having at least a pair of substantially parallel annular beads (12), at least one carcass ply (14) wrapped around said beads, a tread (18) disposed over said at least one carcass ply in a crown area of said tire, and sidewalls (20) disposed between said tread (18) and said beads (12), wherein a reinforcement package (24) is disposed between said tread (18) and said at least one carcass ply (14) in said crown area, said reinforcement package (24) comprising an elastomeric composite having a second end 44 and a first end (32), said elastomeric composite being reinforced with substantially parallel reinforcement cords (26) oriented at substantially 0° with respect to a longitudinal centerline (CL) of said composite, and wherein said composite is folded continuously upon itself to provide reinforcement package (24) having an upper layer (46) characterized in that reinforcement cords therein have an angle of 17 to 35° with respect to the equatorial plane (EP) tire (10), and a lower layer (48) wherein reinforcement cords therein have an angle of −17 to −35° with respect to the equatorial plane (EP) of tire (10), and in that said reinforcement package (24) has a splice (28) wherein upper layer (46) at second end tip (37) of reinforcement package (24) overlaps with lower layer (48) at a first end (32) of reinforcement package (24), said splice (28) comprising a triangular configuration formed by the intersection of a first cut and a second cut, whereby upper layer (46) at first end (32) has a first cut parallel to the edge of the belt and a second cut at angle of 17 to 35° with respect to the width of the composite strip at first end (32) for a distance corresponding to 70 to 90% of the width of elastomeric composite (24), and wherein all cut reinforcement cords (26) are removed from cut-out (30) at first end (32).

2. The tire of claim 1 wherein said reinforcement cords (26) comprise steel, polyester, polyamide, aromatic polyamide, reconstituted cellulose, polyvinyl alcohol, fiberglass, carbon-fibers and mixtures thereof.

3. The tire of claim 1 characterized in that said reinforcement cords (26) are selected from the group comprising polyethylene naphthalate, terephthalate, rayon and aramid.

4. The tire of claim 1 characterized in that said reinforcement cords (26) have a dTex of 3300 to 13000 and an end count in said reinforcement package (24) of 4 to 11 ends per centimeter (e.p.c.).

* * * * *